United States Patent
Razmtouz

(10) Patent No.: US 9,614,635 B2
(45) Date of Patent: Apr. 4, 2017

(54) PREAMBLE DESIGN AND DETECTION FOR RANGING IN AN OPTICAL OFDMA COMMUNICATION NETWORK

(71) Applicant: FRAUNHOFER-GESELLSCHAFT ZUR FÖRDERUNG DER ANGEWANDTEN FORSCHUNG E.V., München (DE)

(72) Inventor: Ali Razmtouz, Berlin (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 14/648,223

(22) PCT Filed: Nov. 30, 2012

(86) PCT No.: PCT/EP2012/074085
§ 371 (c)(1),
(2) Date: May 28, 2015

(87) PCT Pub. No.: WO2014/082679
PCT Pub. Date: Jun. 5, 2014

(65) Prior Publication Data
US 2015/0319028 A1    Nov. 5, 2015

(51) Int. Cl.
*H04J 13/00* (2011.01)
*H04J 14/02* (2006.01)
(Continued)

(52) U.S. Cl.
CPC ....... *H04J 13/0059* (2013.01); *H04J 11/0023* (2013.01); *H04J 14/0298* (2013.01);
(Continued)

(58) Field of Classification Search
USPC .......................................................... 398/67
See application file for complete search history.

(56) References Cited

U.S. PATENT DOCUMENTS

2005/0078734 A1\* 4/2005 Baker ................ H04B 1/71637
375/130
2008/0304828 A1  12/2008 Mizutani et al.
(Continued)

FOREIGN PATENT DOCUMENTS

EP       2015489 A1    1/2009
WO   2007/066982 A2    6/2007
(Continued)

OTHER PUBLICATIONS

Zhuang, Jeff et al., "Ranging Improvement for 802.16e OFDMA PHY" IEEE C802.16e-04/143, Jun. 25, 2004.
(Continued)

*Primary Examiner* — David Payne
*Assistant Examiner* — Omar S Ismail
(74) *Attorney, Agent, or Firm* — Maschoff Brennan

(57) ABSTRACT

The invention relates to an optical OFDMA communication network, comprising a plurality of optical network units (ONUs), wherein each one of the ONUs is configured to generate a ranging sequence for upstream synchronization of the ONUs, a receiving unit for receiving signals of the ONUs, the receiving unit being also configured to receive the ranging sequences of the ONUs. The receiving unit comprises a correlator unit in which a plurality of ranging sequences is stored. The receiving unit is configured to perform a ranging detection operation including performing a correlation operation with a plurality of the received ranging sequences using at least one of the stored ranging sequences and to transmit a ranging response to the ONUs depending on the result of the correlation operation.

16 Claims, 5 Drawing Sheets

(51) Int. Cl.
*H04J 11/00* (2006.01)
*H04L 27/26* (2006.01)
*H04Q 11/00* (2006.01)

(52) U.S. Cl.
CPC ...... *H04L 27/2613* (2013.01); *H04L 27/2655* (2013.01); *H04L 27/2663* (2013.01); *H04L 27/2692* (2013.01); *H04L 27/2697* (2013.01); *H04Q 11/0067* (2013.01); *H04J 2011/0096* (2013.01); *H04Q 2011/0045* (2013.01)

(56) References Cited

U.S. PATENT DOCUMENTS

| | | | |
|---|---|---|---|
| 2009/0141836 A1* | 6/2009 | Shirakata | H04L 27/2662 375/343 |
| 2009/0245790 A1* | 10/2009 | Mizutani | H04J 14/0282 398/43 |
| 2010/0158527 A1* | 6/2010 | Mizutani | H04B 1/707 398/78 |
| 2011/0013708 A1* | 1/2011 | Hedayat | H04L 7/041 375/260 |
| 2012/0314561 A1* | 12/2012 | Xie | H04L 27/2613 370/210 |

FOREIGN PATENT DOCUMENTS

| | | |
|---|---|---|
| WO | 2011/161637 A2 | 12/2011 |
| WO | 2012/136745 A2 | 10/2012 |

OTHER PUBLICATIONS

Guanping Lu et al., "Improve Initial Ranging for Uplink OFDMA Systems by Partial Frequency Sequence Detection" Communication Technology (ICCT), 2011 IEEE, 13th Int. Conference 0N, IEEE, pp. 476-479, XP032120203, DOI: 10.1109/ICCT.2011.6157921 Section II, Sep. 25, 2011.

Neda Cvijetic "OFDM for Next-Generation Optical Access Networks" Journal of Lightwave Technology, vol. 30, No. 4, Feb. 15, 2012.

Han Wang et al., "A Novel Synchronization Algorithm for OFDM Systems with Weighted CAZAC Sequence" Journal of Computational Information Systems 8: 6 (2012) 2275-2283, Mar. 2012.

JongHun Kim and KyungHi Chang, "Ranging Improvement using Successive Interference Cancellation for Multiuser MWiMAX System" IEEE 2009, Sep. 13, 2009.

Luca Sanguinetti and Michele Morelli, "An Initial Ranging Scheme for the IEEE 802.16 OFDMA Uplink" IEEE Transactions on Wireless Communications, vol. 11, No. 9, Sep. 2012.

Dimitrios Katselis, "Some Preamble Design Aspects in CP-OFDM Systems" IEEE Communications Letters vol. 16, No. 3, Mar. 2012.

Tang Yan-bo and Ge Wan-cheng, "Symbol synchronization Algorithm based on Pseudosuperimposed Zadoff-Chu in Advanced-LTE" IEEE 2009 DOI 10.1109/APCIP.2009.44, Jul. 18, 2009.

Kazovsky, L.G. et al., "Broadband Optical Access Networks" Wiley, May 2011.

JP Office Action dated Jun. 21, 2016 as received in Application No. 2015-544366 (English Translation).

\* cited by examiner

PREAMBLE DESIGN AND DETECTION FOR RANGING IN AN OPTICAL OFDMA COMMUNICATION NETWORK

CROSS-REFERENCE TO A RELATED APPLICATION

This application is a National Phase Patent Application of International Patent Application Number PCT/EP2012/074085, filed on Nov. 30, 2012.

BACKGROUND

The invention relates to an optical OFDMA communication network and a method for operating an optical OFDMA communication network.

Optical communication networks—such as a passive optical network (PON)—comprising a plurality of optical network units (ONUs) connected to a receiving unit such as an optical line terminal—OLT are known from the prior art. In particular, the orthogonal frequency division multiple access (OFDMA) scheme can be used for data transmission in such optical communication networks as described in the article "OFDM for Next-Generation Optical Access Networks", N. Cvijetic, J. of Lightwave Technology, vol. 30, No. 4, p. 384-398, February 2012.

SUMMARY

It is an object of the invention to provide an optical communication network with good upstream performance. Further, a corresponding method for operating an optical communication network shall be provided.

These problems are solved by the optical communication network as described herein and by the method as described herein.

Accordingly, an optical communication network is provided, comprising:
- a plurality of optical network units, wherein each one of the ONUs is configured to generate a ranging sequence for upstream synchronization of the ONUs;
- a receiving unit for receiving signals of the ONUs, the receiving unit being also configured to receive the ranging sequences of the ONUs,
- wherein the receiving unit comprises a correlator unit in which a plurality of ranging sequences is stored,
- and wherein the receiving unit (5) is configured to perform a ranging detection operation including performing a correlation operation with a plurality of the received ranging sequences (20b-20n) using at least one of the stored ranging sequences (611) and to transmit a ranging response to the ONUs (2a-2n) depending on the result of the correlation operation.

The ranging procedure that can be carried by the optical communication network according to the invention permits upstream signals (i.e. signals transmitted from the ONUs to the receiving unit) of the ONUs to be synchronized to a local time and/or frequency reference of the receiving unit, thereby taking into account characteristics of the communication links between the ONUs and the receiving unit, e.g. the distance between the ONUs and the receiving unit. Synchronizing the upstream signals, in particular, a degradation of the upstream signal quality caused by, for example, multiple access interference (MAI), symbol timing offset (STO), carrier frequency offset (CFO) and/or intersymbol interference (ISI) can be avoided or at least reduced.

The optical communication network according to the invention is configured to operate according to the orthogonal frequency division multiple access (OFDMA) scheme. OFDMA networks can provide high data rates and spectral efficiency, wherein, for example multi-level modulation schemes could be employed. Further, using cyclic prefixes (CP) the tolerance of the network against chromatic dispersion (CD) and polarisation mode dispersion (PMD) in optical fibres of the network may be increased.

Moreover, in contrast to wavelength division multiplex (WDM) networks, in OFDMA networks the bandwidth could be dynamically and flexibly assigned to different users (e.g. ONUs) depending on their current requirements, for example by adapting the number of assigned subcarriers and/or using different modulation schemes. The number of subcarriers assigned to different users may, for example, be different for each of the OFDM symbols.

In OFDM networks, however, the orthogonality between the different subcarriers used for data transmission should be preserved as good as possible in order to make sure that the OFDM signal is detected and demodulated correctly. Therefore, the ranging procedure in the case of an OFDM(A) network, in particular, makes sure that the orthogonality between the different subcarriers used for data transmission is preserved during the passage from the ONUs to the receiving unit.

The optical communication network according to the invention may be a passive optical network (PON), wherein the receiving unit is an optical line terminal (OLT). The ranging sequences generated and transmitted by the ONUs may be received by a ranging unit of the receiving unit, the ranging unit also carrying out the auto-correlation and cross correlation, respectively. The ranging unit may be realized by a computer code contained in a computer device of the receiving unit or may be realized by a specific hardware device such as an application-specific integrated circuit—ASIC.

The correlation operation performed by the receiving unit, for example, includes executing an auto-correlation and/or cross-correlation of the plurality of the received ranging sequences using at least one of the stored ranging sequences. In particular, the receiving unit performs an auto-correlation and a cross correlation of the received ranging sequences using stored ranging sequences specific to each one of the ONUs.

For example, at least one of the optical network units is configured to generate a ranging sequence that comprises a constant amplitude zero auto correlation (CAZAC) sequence; for example in combination with a pseudo noise (PN) sequence as will be explained below. Such sequences have a constant amplitude resulting in a peak to average power ration of 0 dB. The auto correlation of a CAZAC sequence has only small values outside the central value. Further, a (discrete) Fourier transformation of a CAZAC sequence results in a CAZAC sequence again such that a CAZAC sequence may be used in the time domain as well as in the frequency domain. The general principle of using a CAZAC sequence in a synchronization algorithm is described in the article "A Novel Synchronization Algorithm for OFDM Systems with Weighted CASAC Sequence", H. Wang et al., J. of Computational Information Systems 8, p. 2275-2283, March 2012, which is enclosed by reference herewith.

Using CAZAC sequences may have also the advantage that the ranging sequence is shorter than in conventional ranging procedures used in wireless communication networks and therefore the detection complexity is lower.

Further, these sequences may produce a correlation signal that is easier detectable and may be more robust against unfavourable signal-to-noise ratios.

It is possible that the ranging sequences each comprise a Zadoff-Chu sequence, which is a subset of a CAZAC sequence. For example, a Zadoff-Chu sequence in the form $$Z_r(m) = \begin{cases} e^{-j\frac{2\pi r}{L}\left(\frac{m^2}{2}+m\right)} \text{für } L \text{ gerade} \\ e^{-j\frac{2\pi}{L}\left(\frac{m(m+1)}{2}+m\right)} \text{für } L \text{ ungerade} \end{cases}$$

is used, wherein L is the length and r is the index of the sequence.

The ranging sequence may a preamble of a data signal. For example, the ranging sequence is an OFDM symbol, e.g. consisting of four parts.

In order to obtain a sharp correlation signal the ranging sequence may be formed by repeating a starting sequence Z (e.g. a Zadoff-Chu sequence), e.g. four times such that a sequence $$T=\{ZZZZ\}$$

results.

Further, the ranging sequence generated by each one of the optical network units may comprise a pseudo noise (PN) sequence specific to each one of the optical network units such that the receiving unit can assign a received ranging sequence to the optical network unit which the ranging sequence originates from. The PN sequence, in particular, is combined with a CAZAC sequence; in particular by multiplying the CAZAC sequence with the specific PN sequence. For example, each one of the ranging sequences stored in the correlator unit is assigned to each one of the ONUs and each comprise a PN sequence specific to each one of the ONUs, and wherein the correlation operation is carried out for each one of the received ranging sequences using the assigned ranging sequence.

In particular the first and third elements of the e.g. Zadoff-Chu starting sequence mentioned above is multiplied by a PN sequence (of length L) such that the following (modified) starting sequence S is obtained:

$$S=\{Z*PNZZ*PNZ\}$$

Generating the ranging sequence may also comprise performing a spectral interpolation of the (e.g. sampled) starting sequence. The degree of the spectral interpolation depends on the ratio between the total number of subcarriers provided by the optical communication network and the number of subcarriers provided (in particular by the OLT) for transmitting the ranging sequences.

It is also possible that generating the ranging sequence comprises multiplying the starting sequence by an exponential function in order to shift the sequence in the frequency domain into a predetermined frequency region (provided for example by the OLT for ranging purposes). Thus, an efficient ranging procedure can be established, which may be particularly desired in a PON since the ONUs may be regularly switched into a power saving mode requiring repeating ranging procedures. For example, the optical communication network comprises one or several already synchronized ONU(s).

For example, using the above starting sequence $S=\{Z*PN Z Z*PN Z\}$ a ranging sequence $$S=\text{interpolate}(S,E)*\exp(j2\pi f_R)$$

is generated, wherein E is the degree of interpolation depending on the ratio between the total number of subcarriers provided by the optical communication network and the number of subcarriers provided for transmitting the ranging sequences as already set forth above. The interpolation may be carried out by the receiving unit. It is, however, also possible that the interpolation is performed by the corresponding.

It is noted that conventional ranging procedures used in wireless communication networks cannot be used in a PON as, for example, clock rates are usually much higher in PONs. Further, conventional ranging procedures are based on a synchronous concept, wherein the length of the cyclic prefixes is chosen to be higher than the maximal delay time. This concept, however, cannot be used in a PON because of the shorter OFDM symbols and the larger round trip delays (RTD).

The receiving unit may comprise a peak detecting unit for the detection of peaks in a signal (correlation signal) generated by performing the auto correlation and the cross correlation, respectively. The peak detecting unit may detect a peak if the intensity of the correlation signal exceeds a predetermined threshold value. Depending on the position (on the time or frequency scale) of the peak(s) detected by the peak detecting unit a ranging response signal may be transmitted to the corresponding ONU(s). In particular, the position of the detected peak on the time or frequency axis of the correlation signal corresponds to a delay time and frequency shift, respectively, a signal experiences during the passage from the ONU to the receiving unit.

Accordingly, the ranging response transmitted to the ONU(s) may comprise information about a required time, frequency and/or power shift wherein the optical network units upon receiving the ranging response will change the timing, frequency and/or power settings depending on the information contained in the ranging response before starting data transmission.

According to another example, the receiving unit is configured to perform the auto correlation or cross correlation of the plurality of ranging sequences (generated and transmitted by the ONUs) serially. However, the receiving unit may also carry out the auto correlation or cross correlation of at least two different ranging sequences (generated by two different ONUs) in parallel, wherein, for example, the ranging unit comprises several correlator units (wherein each of which may be assigned to a particular ONU).

The invention also relates to a method for operating an optical OFDMA communication network, in particular using a communication network as claimed in the preceding claims, comprising the steps of:
  generating a plurality of ranging sequences by a plurality of optical network units (ONUs);
  receiving the ranging sequences of the optical network units by a receiving unit, the receiving unit comprising a correlator unit in which a plurality of ranging sequences are stored;
  performing a ranging detection operation including performing a correlation operation with the plurality of received ranging sequences using at least one of the stored ranging sequences; and
  transmitting a ranging response to the optical network units depending on the result of the ranging detection operation.

The embodiments of the invention described above with respect to the communication network can be equally used in the method according to the invention.

BRIEF DESCRIPTION OF THE DRAWINGS

The invention is described in more detail hereinafter by means of embodiments with reference to the drawing.

DETAILED DESCRIPTION

Figure 1:
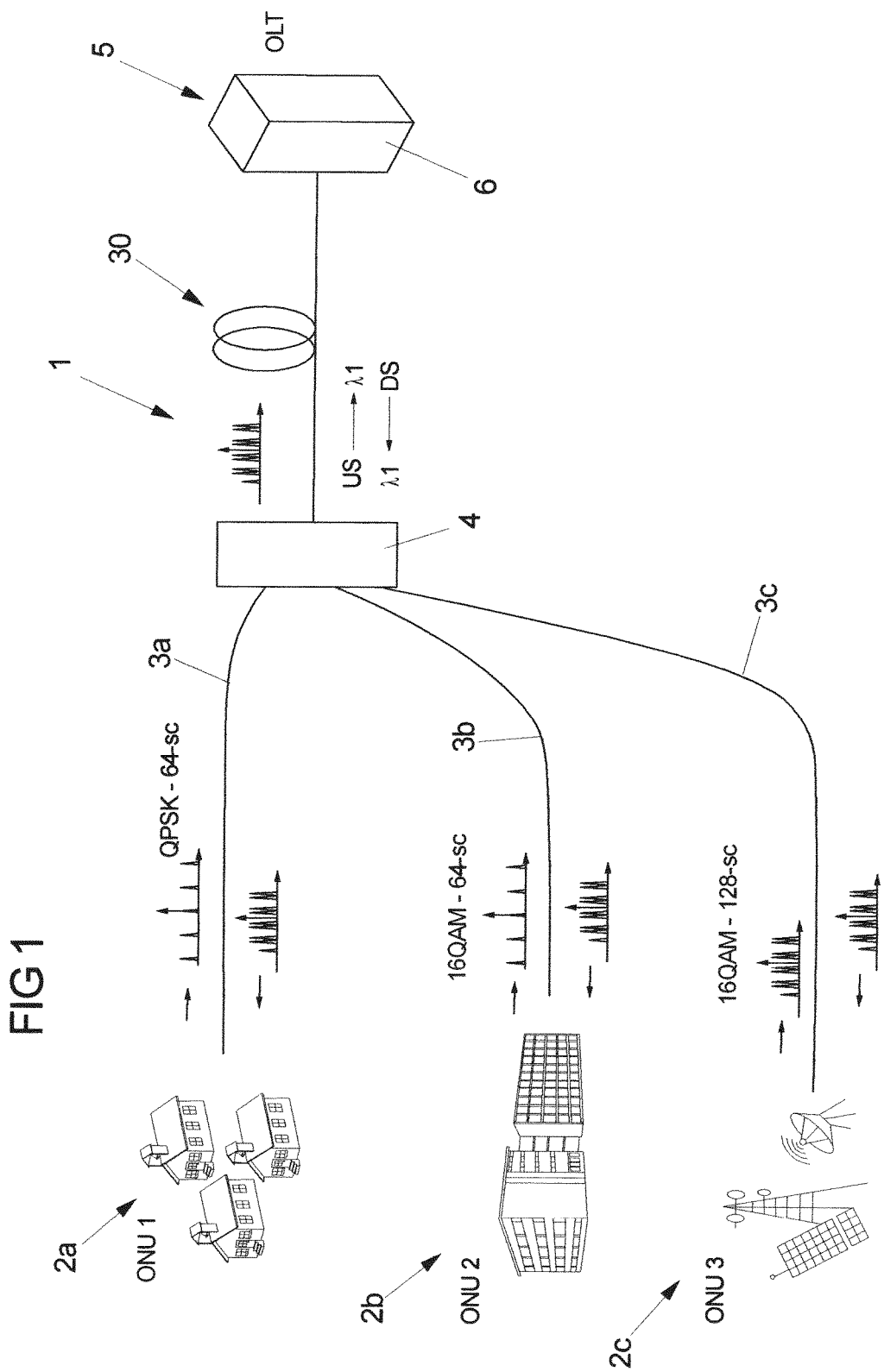
FIG. 1 is a schematic representation of a communication network according to an embodiment of the invention.
Figure 2:
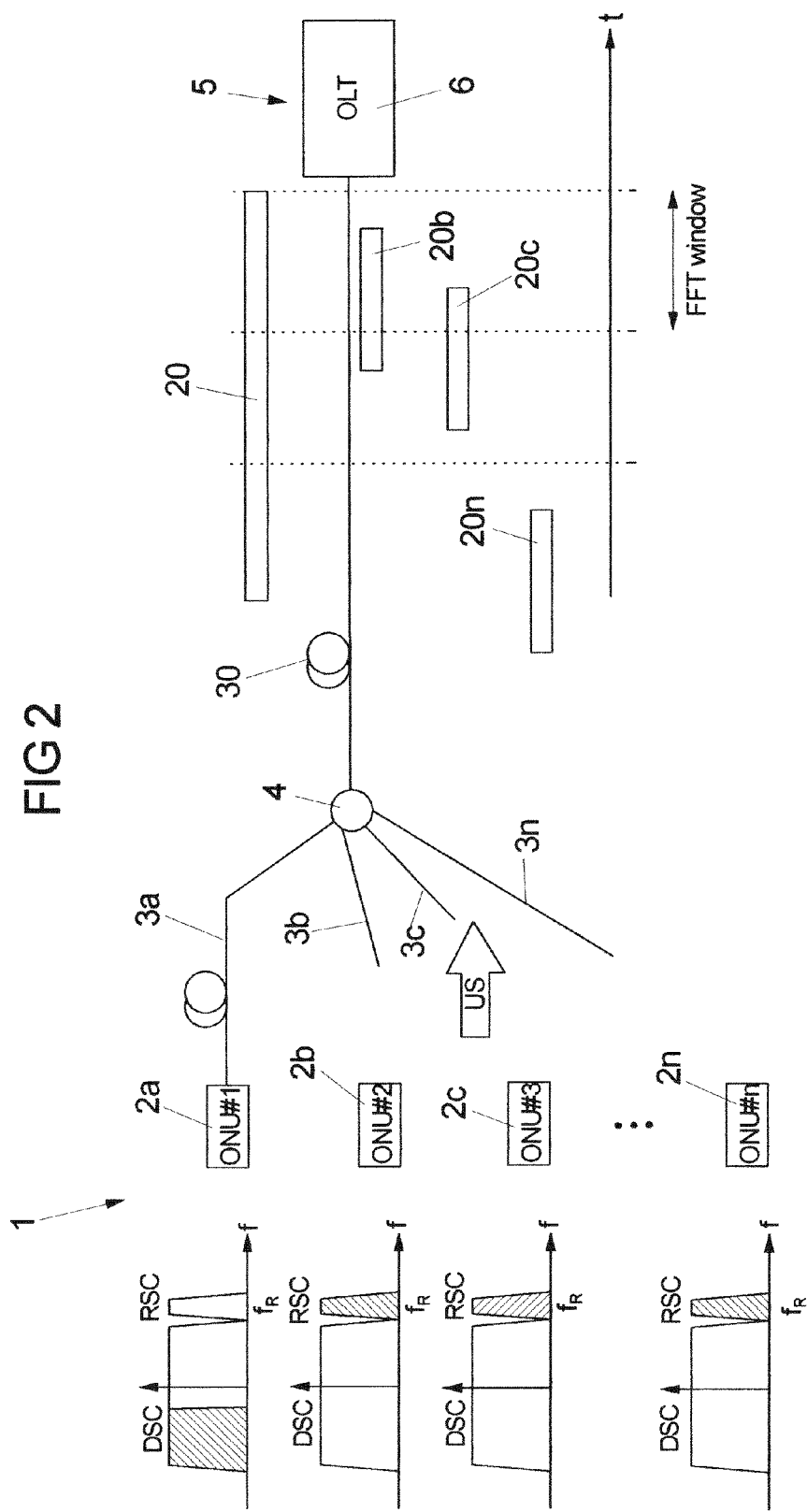
FIG. 2 illustrates the operating method according to the invention.

The optical communication network according to the invention shown in FIG. 1 is a passive optical network (PON) 1 comprising several (three) optical network units (ONUs) 2a to 2c. For example, ONU 2a (having a data rate of e.g. 1-25 Gbps) may be used by private users, ONU 2b (having a data rate of e.g. 1-50 Gbps) may be used by business users and ONU 2c (having a data rate of e.g. 1-100 Gbps) may be a mobile backhaul, i.e. the ONUs 2a-2c have different and changing bandwidth requirements. Of course, more than three ONUs can be provided as indicated in FIG. 2.

The communication network 1 operates under the orthogonal frequency division multiple axis (OFDMA) scheme, wherein a plurality of subcarriers is assigned to each one of the ONUs 2a to 2c. It is possible that different modulation schemes are used on the different subcarriers. For example, ONU 2a uses the quadrature phase shift keying (QPSK) scheme, whereas ONUs 2b and 2c use quadrature amplitude modulation (QAM).

The ONUs 2a to 2c are connected to a receiving unit in the form of an optical line terminal (OLT) 5 (allowing a data rate of e.g. 1-100 Gbps) via glass fibre cables 3a to 3c and an optical splitter 4. Due to the different properties of the glass fibre link between the ONUs 2a-2c and OLT 5 (optical) upstream signals ("US") transmitted from the ONUs 2a-2c towards OLT 5 via fibre link 30 will arrive at the OLT 5 with different delay times.

In particular in order to preserve the orthogonality between the signals transmitted by the ONUs 2a to 2c during the passage from the ONUs 2a to 2c to OLT 5, the ONUs have to be synchronized in upstream direction before they will be allowed to start (load) data transmission. For this, a ranging procedure is carried out, wherein the ONUs that shall be synchronized generate a ranging signal in the form of a ranging sequence and transmit the ranging sequence to OLT 5. It is possible that at least one of the ONUs that is to be synchronized in upstream direction completes a downstream synchronization ("DS"), e.g. via dedicated control channels, before generating the ranging sequence. Depending on the result of the downstream synchronization a starting sequence could be provided on which the ranging sequence is based.

The ranging sequence, for example, is transmitted as a ranging preamble 20a-20n of a data signal as shown in FIG. 2. Due to, for example, different distances between the ONUs 2b-2n, the preambles 20a-20n arrive at OLT 5 with different time delays.

According to the example depicted in FIG. 2, one of the ONUs 2a-2n (ONU 2a) of the optical communication network 1 has already been synchronized and has started upstream data transmission (data sequence 20) such that only ONUs 2b-2n need to be synchronized and therefore transmitted ranging preambles 20b-20n. The ranging preambles 20b-20n are received together with the data signal of synchronized ONU 2a by the OLT 5. OLT 5 comprises a ranging unit 6 for processing the ranging preambles 20b-20n, wherein ranging unit 6 is depicted in FIG. 3 in more detail.

Figure 3:
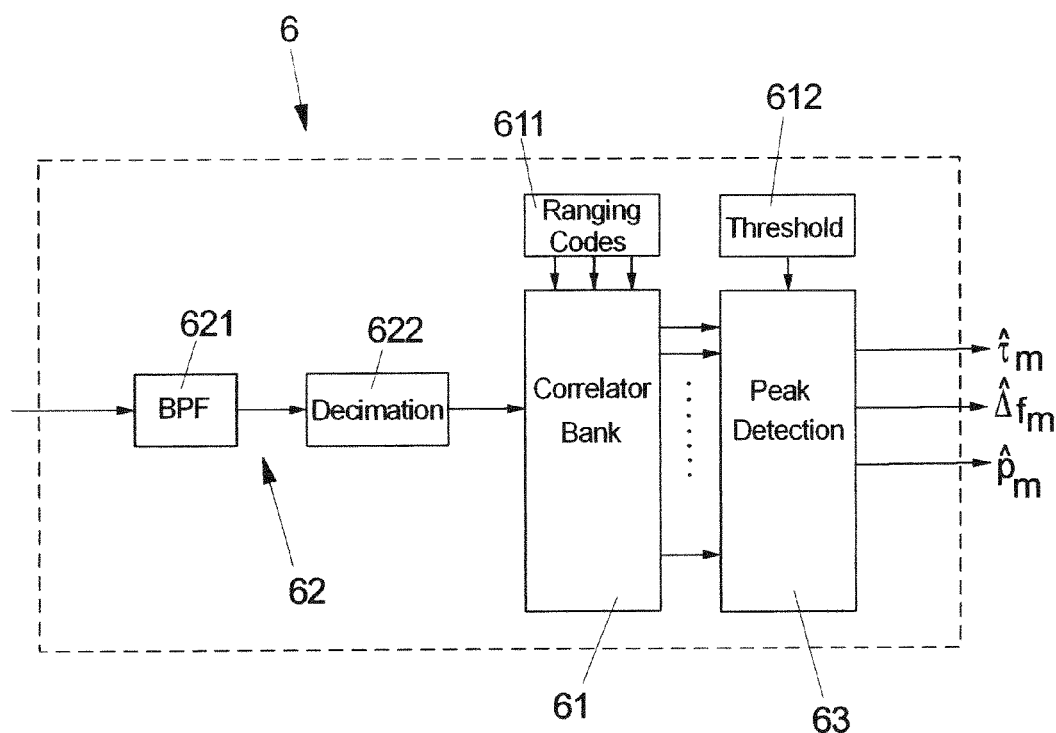
FIG. 3 schematically depicts a ranging unit used in a communication network according to the invention.

According to FIG. 3, ranging unit 6 comprises a filter unit 62 comprising a band pass filter 621 and a decimation unit 622 that extracts the subcarriers (ranging subcarriers RSC in FIG. 2) that are provided for transmitting the ranging sequences from the data subcarriers DSC also arriving at the receiving unit 5. Decimation unit 622 reverses an interpolation of the ranging sequences, i.e. the number of samples is reduced but the sequence is preserved. The extracted ranging subcarriers RSC carrying the ranging preambles 20b-20n are further received by a correlator unit in the form of a correlator bank 61 of the ranging unit 6.

The correlator bank 61 contains a plurality of stored ranging sequences in the form of pseudo noise (PN) sequences 611 and is configured for performing an auto-correlation and/or a cross correlation of the ranging preambles 20b-20n received by the ranging unit 6 using at least one of the stored PN sequences 611. A correlation signal resulting from an auto-correlation or cross-correlation carried out by the correlator bank 61 is transmitted to a peak detection unit 63, which dependent on a predetermined threshold 612 detects peaks in the correlation signals.

Figure 4:
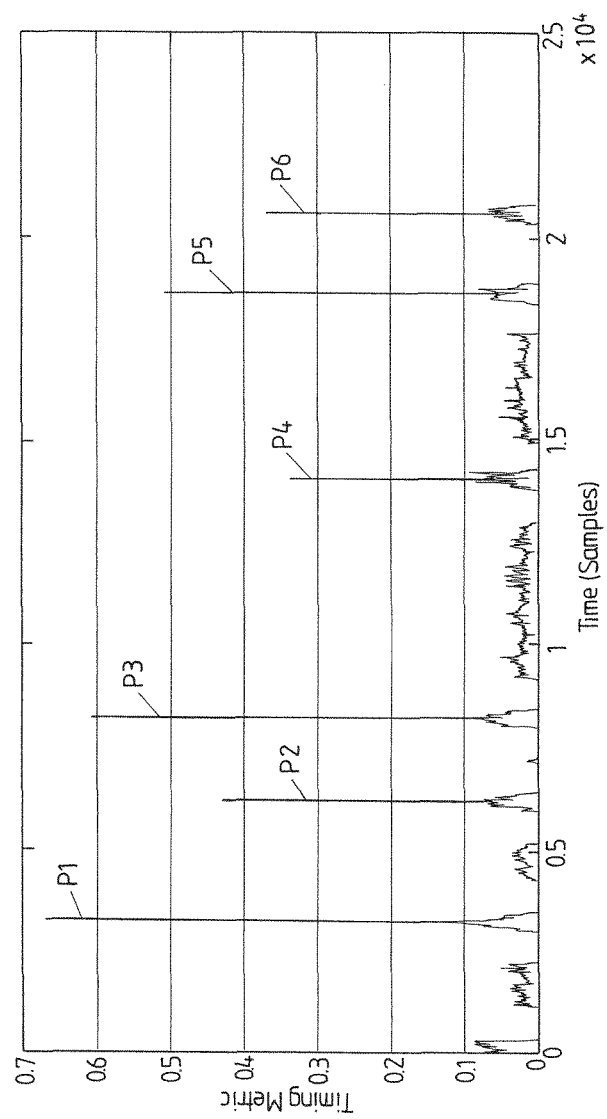
FIG. 4 illustrates the result of a correlation operation performed by the receiving unit upon receipt of a plurality of ranging sequences.

The position (in time) of the detected peaks in the correlation signal may directly correspond to a time delay a signal transmitted by the corresponding ONU experiences during the passage towards OLT 5. Further, the amplitudes of the detected peaks in the correlation signal corresponds to a transmitting power of the corresponding ONU. Therefore, using the positions and the amplitudes of the detected peaks, a correction signal (ranging response) can be generated and transmitted to the ONUs, the correction signal containing information on a change of the timing settings (timing offset) and/or a power change to be implemented by the ONUs in order to synchronize data transmission of the ONU. Also, a frequency shift may be derived from the auto-correlation and cross-correlation signal that may be used to generate a ranging response containing information on a required frequency shift. An exemplary correlation signal is shown in FIG. 4.

The ranging preambles 20b-20n generated by the ONUs 2B, 2C may each comprise a combination of a constant amplitude zero auto-correlation (CAZAC) sequence and a pseudo-noise (PN) sequence as set forth above, wherein the PN sequence may be randomly selected. The PN sequence is used by the ranging unit 6 to identify the ONU that generated and transmitted the corresponding ranging preamble. A collision of the different ranging preambles 20b-20n is admissible due to the orthogonality of the ranging preambles. In particular, the ranging preambles 20b-20n are generated from a starting sequence comprising the CAZAC and the PN sequence, wherein the starting sequence is spectrally interpolated, in particular in order to reduce the frequency band width required for transmitting the ranging preambles and thus the frequency band occupied by the ranging subcarriers RSC (FIG. 2). Further, the starting sequence comprising the CAZAC and the PN sequence may be multiplied by an exponential function depending on a frequency shift $f_R$ in order to shift the ranging sequence to the desired frequency, i.e. on the ranging subcarriers, which may have a considerable frequency distance from the subcarriers used for (load) data transmission (subcarriers DSC of synchronized ONU 2a in FIG. 2) in order to avoid interference of the ranging preambles 20b-20n with the data subcarriers DSC.

More particularly, the correlator bank 61 may determine a timing metric $G_m(d)$ for each one of the ranging preambles 20b-20n, wherein $$G_m(d) = \frac{|W_m(d)|^2}{R(d)^2}$$

wherein d represents a time delay (or a frequency shift) and wherein $$W_m(d) = \sum_{k=0}^{N_1-1} PN_m(k) \cdot S^*(d+k) \cdot S\left(d+k+\frac{3N}{4}\right)$$

and $$R(d) = \frac{1}{4} \cdot \sum_{l=0}^{3} \sum_{k=0}^{N_1-1} \left| r\left(d+k+l\frac{N}{4}\right) \right|^2$$

wherein $PN_m$ is the PN sequence of the ranging preamble of ONU m and S is the CAZAC sequence of the ranging preamble. N is the number of samples in the preamble and $N_1=N/4$ corresponds to the length (samples) of the used PN sequence.

The peak detecting unit 63 detects a peak of the correlation signal, i.e. of the timing metric $G_m(d)$, if it exceeds a threshold 612. That is, a ranging preamble will be detected and a time delay position (timing offset) $\hat{d}_m$ will be identified if $$\hat{d}_m = \operatorname{argmax}_d(G_m(d))$$

Depending on the determined time delay $\hat{d}_m$ and amplitude $G_m(\hat{d}_m)$ the ranging unit 6 generates a ranging response signal containing the required timing offset $\tau_m$ and power change $\hat{p}_m$. Similarly, a required frequency shift $\Delta \hat{f}_m$ could be determined. The response signal is transmitted to the corresponding ONUs, which thereupon change there timing, power and/or frequency settings before starting synchronous data transmission.

If the ranging preamble of one of the ONUs is not detected (i.e. no ranging response has been received by that ONU) the ONU may transmit the ranging preamble (e.g. after a certain back-off time) again with higher power.

FIG. 4 illustrates a simulated output of the correlator bank 61 of the ranging unit 6, wherein six ranging preambles (corresponding to six ONUs to be synchronized in upstream direction) have been received and processed by ranging unit 6. The simulation considered the different signal processing units (of ranging unit 6) as well as the optical components of the OFDM communication network. Besides the six ONUs to be synchronized (i.e. the "ranging ONUs"), the communication network comprises one synchronized ONU.

Further, a frame of 10 OFDM symbols having a sampling rate of 12 GS/s and a bandwidth of 1 GHz transmitted over a distance of 20 kilometers via a standard mode fibre was used. The synchronized ONU uses 250 subcarriers for data transmission, wherein the total number of subcarriers and the FFT length is 1,024. Different numbers of ranging preambles within a frame have been simulated.

Figure 5:
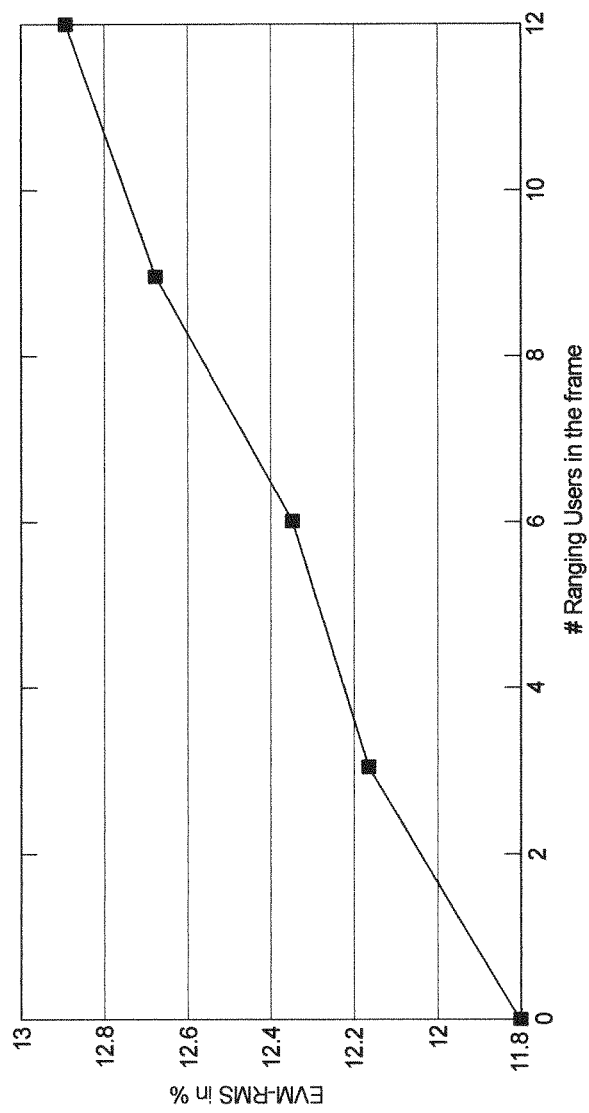
FIG. 5 illustrates the error vector magnitude of a synchronized ONU in a frame depending on the number of existing ranging ONUs in the frame.

The peaks P1-P6 of the simulated timing metric (y-axis, corresponding to timing metric $G_m(d)$ defined above) can be assigned to the ranging preambles of the different ranging ONUs, wherein the location of peaks P1-P6 on the time axis (x-axis) may correspond to the transmission time of the ranging preambles (e.g. ranging preambles 20b-20n in FIG. 2), i.e. the time the ranging preambles need for the passage between the corresponding ONUs and the receiving unit 5. A peak will be detected if its amplitude exceeds a certain threshold as set forth above. Thus, on the one hand, the ranging preambles transmitted by the ranging ONUs need to have an amplitude sufficiently large such that its corresponding peak in the correlation signal (in the timing metric) exceeds the threshold, and on the other hand the amplitude should not be too high in order to avoid interference with the data subcarriers used by the synchronized ONU. FIG. 5 illustrates the error vector magnitude (EVM) (y-axis) of the synchronized ONU depending on the number of ranging ONUs. The EVM value increases with increasing number of ranging ONUs (x-axis), wherein, however, only a slight increase of around 1% in the EVM occurs when 12 ranging ONUs are provided. This indicates that the ranging procedure that can be carried by an optical network according to the invention only slightly interferes with the data subcarriers.

REFERENCE SIGNS 1 communication network
2a-2n ONU
3a-3n optical fibre
4 splitter
5 OLT
6 ranging unit
20 data
20a-20n ranging preamble
30 fibre link
61 correlator bank
62 filtering unit
63 peak detection unit
611 stored ranging sequences
612 thresholds
621 band pass filter
622 decimation unit

The invention claimed is:

1. An optical OFDMA communication network, comprising:
a plurality of optical network units (ONUs), wherein each one of the ONUs is configured to generate a ranging sequence for upstream synchronization of the ONUs and wherein at least one of the ONUs is configured to generate a ranging sequence that comprises a constant amplitude zero auto correlation (CAZAC) sequence;
a receiving unit for receiving signals of the ONUs, the receiving unit being also configured to receive the ranging sequences of the ONUs,
wherein the receiving unit comprises a correlator unit in which a plurality of ranging sequences is stored,
and wherein the receiving unit is configured to perform a ranging detection operation including performing a correlation operation with a plurality of the received ranging sequences using at least one of the stored ranging sequences and to transmit a ranging response to the ONUs depending on the result of the correlation operation.

2. The optical communication network according to claim 1, wherein the optical communication network is a passive optical network (PON).

3. The optical communication network according to claim 1, wherein the receiving unit is an optical line terminal (OLT).

4. The optical communication network according to claim 1, wherein the correlation operation includes performing an auto-correlation and/or cross-correlation of the plurality of the received ranging sequences using at least one of the stored ranging sequences.

5. The optical communication network according to claim 1, wherein the ranging sequence generated by each one of the ONUs comprises a pseudo noise (PN) sequence specific to each one of the ONUs such that the receiving unit can assign the received ranging sequence to the ONUs.

6. The optical communication network according to claim 1, wherein the ranging sequence generated by each one of the ONUs comprises a pseudo noise (PN) sequence specific to each one of the ONUs such that the receiving unit can assign the received ranging sequence to the ONUs and a CAZAC sequence multiplied by the specific PN sequence.

7. An optical OFDMA communication network, comprising:
  a plurality of optical network units (ONUs), wherein each one of the ONUs is configured to generate a ranging sequence for upstream synchronization of the ONUS;
  a receiving unit for receiving signals of the ONUs, the receiving unit being also configured to receive the ranging sequences of the ONUs,
  wherein the receiving unit comprises a correlator unit in which a plurality of ranging sequences is stored,
  wherein the receiving unit is configured to perform a ranging detection operation including performing a correlation operation with a plurality of the received ranging sequences using at least one of the stored ranging sequences and to transmit a ranging response to the ONUs depending on the result of the correlation operation, and
  wherein each one of the ranging sequences stored in the correlator unit is assigned to each one of the ONUs and each comprise a pseudo noise (PN) sequence specific to each one of the ONUs, and wherein the correlation operation is carried out for each one of the received ranging sequences using the assigned ranging sequence.

8. An optical OFDMA communication network, comprising:
  a plurality of optical network units (ONUs), wherein each one of the ONUs is configured to generate a ranging sequence for upstream synchronization of the ONUs;
  a receiving unit for receiving signals of the ONUs, the receiving unit being also configured to receive the ranging sequences of the ONUs,
  wherein the receiving unit comprises a correlator unit in which a plurality of ranging sequences is stored,
  wherein the receiving unit is configured to perform a ranging detection operation including performing a correlation operation with a plurality of the received ranging sequences using at least one of the stored ranging sequences and to transmit a ranging response to the ONUs depending on the result of the correlation operation, and
  wherein generating the ranging sequence comprises performing a spectral interpolation of a starting sequence.

9. The optical communication network according to claim 8, wherein the degree of the spectral interpolation depends on the ratio between the number of subcarriers provided for transmitting the ranging sequences and the total number of subcarriers provided by the optical communication network.

10. The optical communication network according to claim 1, wherein generating the ranging sequence comprises multiplying a starting sequence by an exponential function.

11. The optical communication network according to claim 1, wherein the receiving unit comprises a peak detecting unit for the detection of peaks in a signal generated by performing the auto correlation and the cross correlation, respectively.

12. The optical communication network according to claim 1, wherein the ranging response comprises information about a required time, frequency and/or power change, wherein the ONUs upon receiving the ranging response will change the timing, frequency and/or power settings depending on the information contained in the ranging response before starting data transmission.

13. The optical communication network according to claim 1, wherein the auto correlation and/or the cross correlation is carried out in the time domain.

14. The optical communication network according to claim 1, wherein the receiving unit is configured to perform the auto correlation or cross correlation of the plurality of ranging sequences serially.

15. The optical communication network according to claim 1, wherein the receiving unit is configured to perform the auto correlation or cross correlation of the plurality of ranging sequences in parallel.

16. A method for operating an optical OFDMA communication network, comprising the steps of:
  generating a plurality of ranging sequences by a plurality of optical network units (ONUS), including at least one of the plurality of ONUs generating a ranging sequence that comprises a constant amplitude zero auto correlation (CAZAC) sequence;
  receiving the ranging sequences of the ONUs by a receiving unit, the receiving unit comprising a correlator unit in which a plurality of ranging sequences are stored;
  performing a ranging detection operation including performing a correlation operation with the plurality of received ranging sequences using at least one of the stored ranging sequences; and
  transmitting a ranging response to the ONUs depending on the result of the correlation operation.

* * * * *